(No Model.)

I. L. DAVENPORT.
FILTER FOR OIL CANS.

No. 513,893. Patented Jan. 30, 1894.

UNITED STATES PATENT OFFICE.

ISAAC L. DAVENPORT, OF WOODSTOWN, NEW JERSEY.

FILTER FOR OIL-CANS.

SPECIFICATION forming part of Letters Patent No. 513,893, dated January 30, 1894.

Application filed March 7, 1893. Serial No. 464,969. (No model.)

*To all whom it may concern:*

Be it known that I, ISAAC L. DAVENPORT, a citizen of the United States, residing at Woodstown, in the county of Salem and State of New Jersey, have invented certain new and useful Improvements in Filters for Oil-Cans; and I do declare the following to be a full, clear, and exact description of the invention, such as will enable others skilled in the art to which it appertains to make and use the same.

My invention relates to improvements in oil cans or lubricators, of that class which embody a feed tube having a small discharge aperture; and it has for its general object to provide such cans or lubricators with a filter adapted to trap all foreign substances as the oil passes to the discharge aperture and thus prevent the objectionable choking or closure of said aperture, so often experienced.

A further object of the invention is to provide a filter for the purpose stated, embodying such a construction that it may be readily placed and secured in position and may be as readily removed when it is desired to clean it.

With the foregoing ends in view the invention will be fully understood from the following description and claim when taken in connection with the accompanying drawings, in which—

Figure 1:
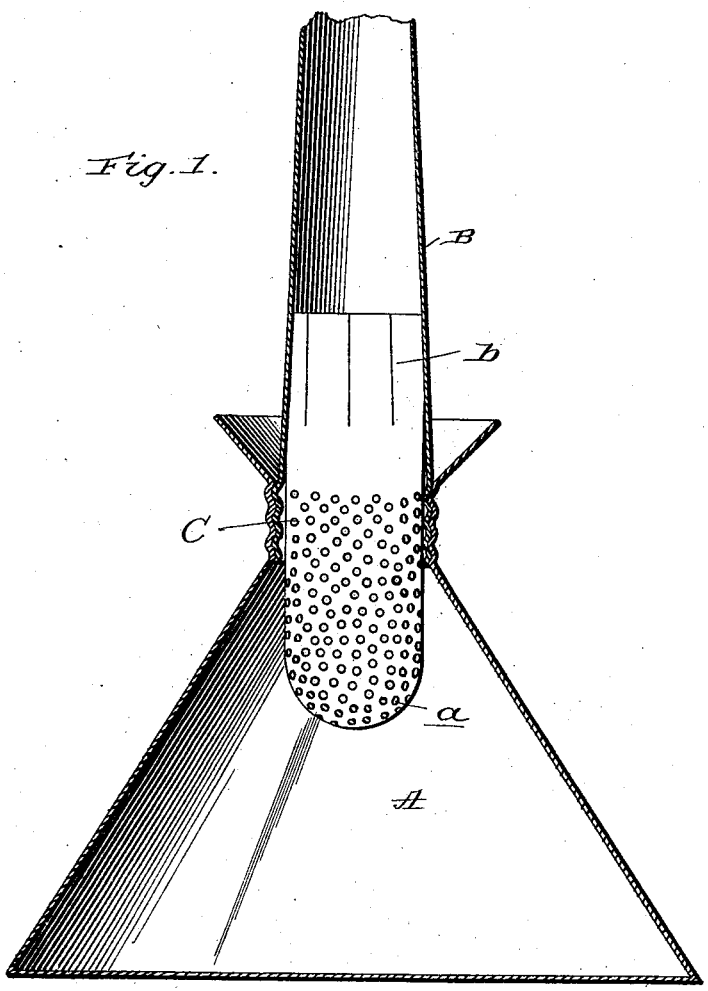
Figure 2:
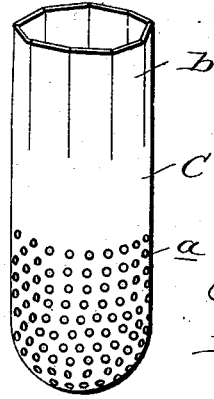

Figure 1, is a vertical diametrical section of an oil can or lubricator provided with my improved filter, and Fig. 2, is a perspective view of the filter, removed.

Referring by letter to said drawings: A, indicates the body or reservoir of an oil can or lubricator which may be of any approved form and construction, and B, indicates the feed tube thereof which is generally tapered toward its outer end and is provided at such end with a contracted discharge aperture.

C, indicates my improved filter which is designed to be arranged in the can as shown in Fig. 1. This filter is preferably of a general cylindrical form, as illustrated, and it is provided at its closed end, which is preferably rounded as shown, and in the lower portion of its side with perforations *a*, for the passage of the oil into the tube B. By providing apertures *a*, in both the closed end and side of the filter, as shown, it will be seen that the oil will enter the feed tube almost as quickly as when there is no obstruction between the body and tube which is highly desirable. As better illustrated in Fig. 2, of the drawings, the filter C, has its outer end open so as to permit the oil to flow freely into the tube B, and it also has its outer portion split longitudinally as illustrated so as to form the resilient strips *b*, which are designed to engage the tube B, and by frictional contact hold the filter securely in position. By this manner of securing the filter in position it will be seen that while it is not liable to casual displacement, yet it may be readily removed to be cleaned or for any other purpose, and may be as readily replaced and secured in position which is an important desideratum.

Furthermore it will be noted that the filter may be secured in any feed tube without altering the same and without the employment of tools, which is desirable inasmuch as the filters may be put upon the market as articles of commodity and may be placed in the cans or lubricators by the users thereof.

In the practice of my invention it will be seen that while an ample amount of oil is permitted to pass into the feed tube, all foreign substances such as chips, dirt, &c., will be retained in the body or reservoir and the objectionable choking or closing of the discharge aperture will be prevented.

It will be noted from the foregoing description taken together with the drawings, that my improved filter is exceedingly cheap and simple; that it is highly efficient in use, and that it may be readily removed from the can or lubricator by simply disconnecting the tube thereof and pulling it out of the tube.

Having described my invention, what I claim is—

In an oil can, the combination with the body or reservoir and the tapering feed tube; of a filter arranged in the can and comprising a hollow body having one of its ends closed and perforated and its opposite end open and also having the strips *b*, at its open end adapted to frictionally engage the feed tube of the can, substantially as and for the purpose set forth.

In testimony whereof I affix my signature in presence of two witnesses.

ISAAC L. DAVENPORT.

Witnesses:
LYDIA E. ARMSTRONG,
WM. W. ARMSTRONG.